United States Patent [19]

Fortier et al.

[11] Patent Number: 5,276,860
[45] Date of Patent: Jan. 4, 1994

[54] DIGITAL DATA PROCESSOR WITH IMPROVED BACKUP STORAGE

[75] Inventors: Richard W. Fortier, Acton; Robert M. Mastors, Ayer; Tracy M. Taylor, Upton; John J. Wallace, Franklin, all of Mass.

[73] Assignee: Epoch Systems, Inc., Westborough, Mass.

[21] Appl. No.: 452,960

[22] Filed: Dec. 19, 1989

[51] Int. Cl.[5] .......................................... G06F 12/16
[52] U.S. Cl. ............................ 395/575; 364/DIG. 1; 364/285.1
[58] Field of Search .................. 371/10.1; 364/285.1; 395/575

[56] References Cited

U.S. PATENT DOCUMENTS

| | | | |
|---|---|---|---|
| 3,806,888 | 4/1974 | Brickman et al. | 340/172 |
| 4,429,363 | 1/1984 | Duke et al. | 364/200 |
| 4,934,823 | 6/1990 | Okami | 364/200 |
| 5,089,958 | 2/1992 | Horton et al. | 395/575 |
| 5,133,065 | 7/1992 | Cheffetz et al. | 395/575 |

FOREIGN PATENT DOCUMENTS

| | | | |
|---|---|---|---|
| 971285 | 7/1975 | Canada | 354/239 |
| 0205965 | 12/1986 | European Pat. Off. | |

OTHER PUBLICATIONS

Machrone, B., et al., "Tape Backup", *PC Magazine*, Feb. 11, 1986, pp. 106-132.
Rosch, W., "Eradicating Erasures", *PC Magazine*, Apr. 15, 1986, pp. 251-257.
Mendelson, E., "Backup Software", *PC Magazine*, Aug. 1989, pp. 269-319.
Beeler, J. "GTE Tries Incremental Backup", ComputerWorld, vol. 21, No. 40, Oct. 9, 1989, pp. 61, 64.
Muuss et al., "BUMP The BRL/USNA Migration Project", Mar. 5, 1989, pp. 1-19.
Thompson et al., "The Operation and Use of a 2 Terabyte Optical Archival Store", Digest of Papers, Ninth IEEE Symposium, Nov., 1988, p. 88.
Arneson, D. A., "Mass Storage Archiving in Network Environments", Digest of Papers, IEEE Symposium, Oct.-Nov. 1988, pp. 45-50.
Hume, A., "The File Motel—An Incremental Backup System for Unix", Summer USENIX '88, pp. 61-72.
Arnold et al., "Automatic UNIX Backup in a Mass Storage Environment", Proceed. of USENIX Assoc., Feb. 1988, pp. 131-136, abstract only.

(List continued on next page.)

*Primary Examiner*—Stephen M. Baker
*Attorney, Agent, or Firm*—Lahive & Cockfield

[57] ABSTRACT

An improved backup storage system and method for use in conjunction with hierarchical or mass storage servers and networks is disclosed. Baseline, full and incremental backup procedures are used to save file copies. In one preferred embodiment, the baseline backup procedure is used to store copies of stable files, i.e. files that are modified less frequently, if at all. With a hierarchical storage server, such files are typically those stored on tertiary storage media, e.g. erasable optical disks, WORMs or magnetic tape. The full backup procedure stores, as full backup copies, copies of all files not in the baseline backup and files that have been changed since the time of their baseline backup. The full backup procedure also stores file identifiers and signal representative of storage locations of baseline backup copies for files which have not been changed since the time of the baseline backup. The incremental backup procedure stores, as incremental backup copies, copies of files not in the baseline or full backups, e.g., new files, and files that have changed since the time of their last backup (baseline, full or incremental). The incremental backup procedure also stores file identifiers and signals representative of storage locations of baseline backup copies for files which have not been changed since the time of the baseline backup, and also stores file identifiers and signals representative of storage locations of full and incremental backup copies for files which have not been changed since the time of their full or incremental backup.

20 Claims, 1 Drawing Sheet

OTHER PUBLICATIONS

Christman, "Experience With File Migration", Los Alamos National Lab Report No. LA-9014, Oct. 1981.

McLarty et al., "A Functional View Of The Los Alamos Central File System", Sixth IEEE Symposium, Jun. 1984, pp. 10-16.

Collins et al., "A Network File Storage System", Fifth IEEE Symposium, Oct. 1982, pp. 99-102.

Gwatking, Electronics Research Lab Adelaide (Australia), Report No. ERL-0009-TR, Apr. 1978.

Miller, "Direct Access Data Migration System", U.S.-D.A. Report No. USDA/DF-78/016, Mar. 1978.

Johnson, C., "IBM 3850—Mass Storage System", AFIPS Conference Proceedings, May 1975, vol. 44, pp. 509-514.

Johnson, C., "The IBM 3850: A Mass Storage System with Disk Characteristics", Proc. of the IEEE, vol. 63, No. 8, Aug. 1975, pp. 1166-1170.

Murray, "Document Based on Clustered Files", Thesis, Cornell Univ. Dept. of Computer Science, Ithaca, N.Y., May 1972.

Fiedler, "QBAX: An Incremental Backup Utility", Microsystems USA, vol. 4, No. 10, Oct. 1983, p. 84, abstract only.

McGee, "Epoch Combines Magnetic Optical Drives", Computer Systems News, Oct. 31, 1988.

Epoch Systems press release, "Epoch Systems To Develop New Generation of High Capacity File Servers For Networked Workstations", Mar. 14, 1988.

DIGITAL DATA PROCESSOR WITH IMPROVED BACKUP STORAGE

BACKGROUND OF THE INVENTION

This application relates to digital data processing and, more particularly, methods and apparatus for improved backup storage.

Use of high-performance, high-resolution graphics has grown significantly over the last several years, with indications that it will continue to grow through the next decade. Fueling user demand has been the introduction of lower cost 32-bit work-stations and an increase in the base of applications software available for those systems. Because of their computational and graphics power, these workstations are employed in data-intensive applications such as electronic publishing, computer-aided design and scientific research.

Paralleling these developments has been the emergence of industry standard communication protocols which permit users to operate in a multi-vendor environment. Of particular interest is the Network File System (NFS) protocol, developed by Sun Microsystems, allowing users to share files across a local area network such as Ethernet.

The data storage requirements of professional workgroups employing networked workstations can measure in the billions of bytes (gigabytes). Much of this results from users generating and accumulating large file sets which have aged, but which are considered valuable for future use.

Potential costs associated with the online storage of such data accumulations force system administrators to periodically remove inactive data from the online file server environment, archiving it to magtape or an equivalent medium. This "solution" poses its own problems. First, the selection of information to be archived is often arbitrarily based solely on the amount of disk space allocated to a user. Secondly, in many computing systems, e.g., those running under the UNIX operating system, no ready means is provided for cataloging information stored offline, requiring users to manually track their own archived files.

Related problems occur in the "backing up" of data—that is, the storing copies of computer files (typically on off-line media) that can be recovered in the event of data loss. Conventional prior backup systems use two types of backups, full and incremental. During a full backup, the system transfers copies all the data on the computer (or network) to a set of one or more backup volumes, e.g., magnetic tapes. During later incremental backups, copies all of the files that have changed since either the last full backup or the most recent incremental backup are transferred to those volumes.

Because they are complete copies of all data, full backups can be very time consuming. Even assuming a high-performance backup device capable 1 MB/sec transfers, and software capable of driving such a device at its rated capacity, it takes 25 hours to back up a relatively modest 100 GB of data. The times required to Perform a full back-up of terabyte and larger storage are prohibitively long for normal use.

Incremental backups are generally much smaller than full backups and, hence, can be performed much faster. As a disadvantage, however, restoring lost data generally takes longer as the number of incremental backups increases, since several backups volumes—the original full backup volume and all subsequent incremental volumes—must be processed in order to recover current files.

One attempt to automate incremental backup procedures is described in Hume, "The File Motel— An Incremental Backup System for UNIX," Summer USENIX '88, pp. 61-72. That system is understood to utilize batch jobs to send copies of modified file copies to a central backup system, which stores those copies, e.g., on a write-once-read-many (WORM) optical disk, along with internally generated file names. A database links the original filename and modification times to the backup copy name.

The Hume system is understood to suffer a number of drawbacks. Among these, the difficulty in knowing a file's "true" name (e.g., where a portion of that name includes a symbolic link) and, consequently, in discerning which backed up file to recover. In addition, there exists the risk that a file will not get backed up until a day or two after it has been modified, as a result of a network or machine failure. Still further, lacking a full backup facility, the capability of recovering any particular file under the Hume system requires that the user have specifically selected that file for backup.

In view of these and other problems present by prior art backup systems, the object of this invention is to provide digital data processing apparatus and methods with improved backup storage.

Another object of the invention is to provide a backup system that reduces the time and cost associated with convention full/incremental backup schemes.

A further object of the invention is to provide a backup mechanism amenable for use in conjunction with hierarchical or mass storage servers and networks.

SUMMARY OF THE INVENTION

The aforementioned and other objects are attained by the invention, which provides a digital data processing system, e.g., networked workstation, that uses a "baseline" backup procedure, in addition to full and incremental backups, to save file copies. In one preferred embodiment, the baseline backup procedure is used to store copies of the system's stable files, i.e., files that are modified less frequently, if at all. With a hierarchical storage server, such files are typically those stored on tertiary storage media, e.g., erasable optical disks, WORMS or magnetic tape.

The full backup stores copies of all files not in the baseline backup, and files that have changed since the time of their baseline backup; while the incremental backup stores copies of files not in the baseline or full backups, e.g., new files, and files that have changed since the time of their last backup (baseline, full or incremental).

The system does not copy the contents of unmodified baseline backup files to subsequent full and incremental backups. It does, however, copy the attributes of those files to the full/incremental backup volumes. This enables the system to treat baseline backup copies as current so long as the associated file contents per se have not changed. Thus, for example, simply renaming a file or changing its access control attributes does not render the baseline backup obsolete, as these changes only effect the file characteristics and not the data contents themselves.

In one broad aspect of the invention, a digital data processing system constructed in accord with the invention includes a memory element that stores one or more files, e.g., program or data files, each being characterized by a filename and one or more attributes. The memory element may comprise a random access memory and disk drives, or it may include a hierarchical storage server with high-speed secondary and slower tertiary storage media.

The system further includes a baseline-backup element coupled to the memory for retrieving selected files, for example, those meeting a baseline backup file specification, and for storing copies of those files. These can include files that are less frequently updated, for example, files stored on tertiary storage media. Baseline backup copies are stored, for example, on magnetic disk or tape and, preferably, on optical disk.

Associated with each baseline backup copy is a baseline backup file ID identifying the volume containing the baseline backup copy and the location of the baseline backup copy within that volume. If the baseline backup copy is successfully made, this identifier is recorded as the first attribute of the original file in the memory element. If the file has no baseline backup copy associated with it, the first attribute will have a recognizable NULL value. Thus, the first attribute of the file serves as both an indicator of whether or not a baseline backup copy of the file exists, and to locate the baseline backup copy.

In this regard, the baseline backup can greatly accelerate restoring an hierarchical storage server to service after a catastrophic data loss. By writing baseline backup data in the same format and to the same media as that used for tertiary storage by the server, the baseline backup volumes can serve as a replacement set of tertiary storage volumes in the event the original volumes are destroyed. Here, in addition to restoring the magnetic disks from the full and incremental backup volumes, the attributes of non-resident files may be modified to point to the baseline backup volumes, rather than lost tertiary storage volumes.

A digital data processing system as described above includes, further, a full backup element that retrieves files for which no baseline backup copies are stored, as well as files for which baseline backup copies are stored but which have been updated (or created) since the time of their backup. These full backup copies can be stored on any suitable medium and, preferably, on magnetic tape. In addition to the file copies, the full backup element stores file characteristics, particularly, the baseline backup volume and file location, of those files in baseline backup storage.

A system constructed in accord with the invention can further include an incremental backup element for storing on the backup media those files which meet an incremental backup file specification and which have been updated (or created) since the of their last backup on either the baseline, full or incremental backup volumes.

In still other aspects, a digital data processing system of the type described above can include a mechanism for recovering files, directories or file systems backup storage. These and other aspects of the invention are evident in the following description and in the attached drawings.

BRIEF DESCRIPTION OF THE DRAWINGS

A fuller understanding of the invention may be obtained by reference to the drawings, in which.

DETAILED DESCRIPTION OF THE ILLUSTRATED EMBODIMENT

Figure 1:
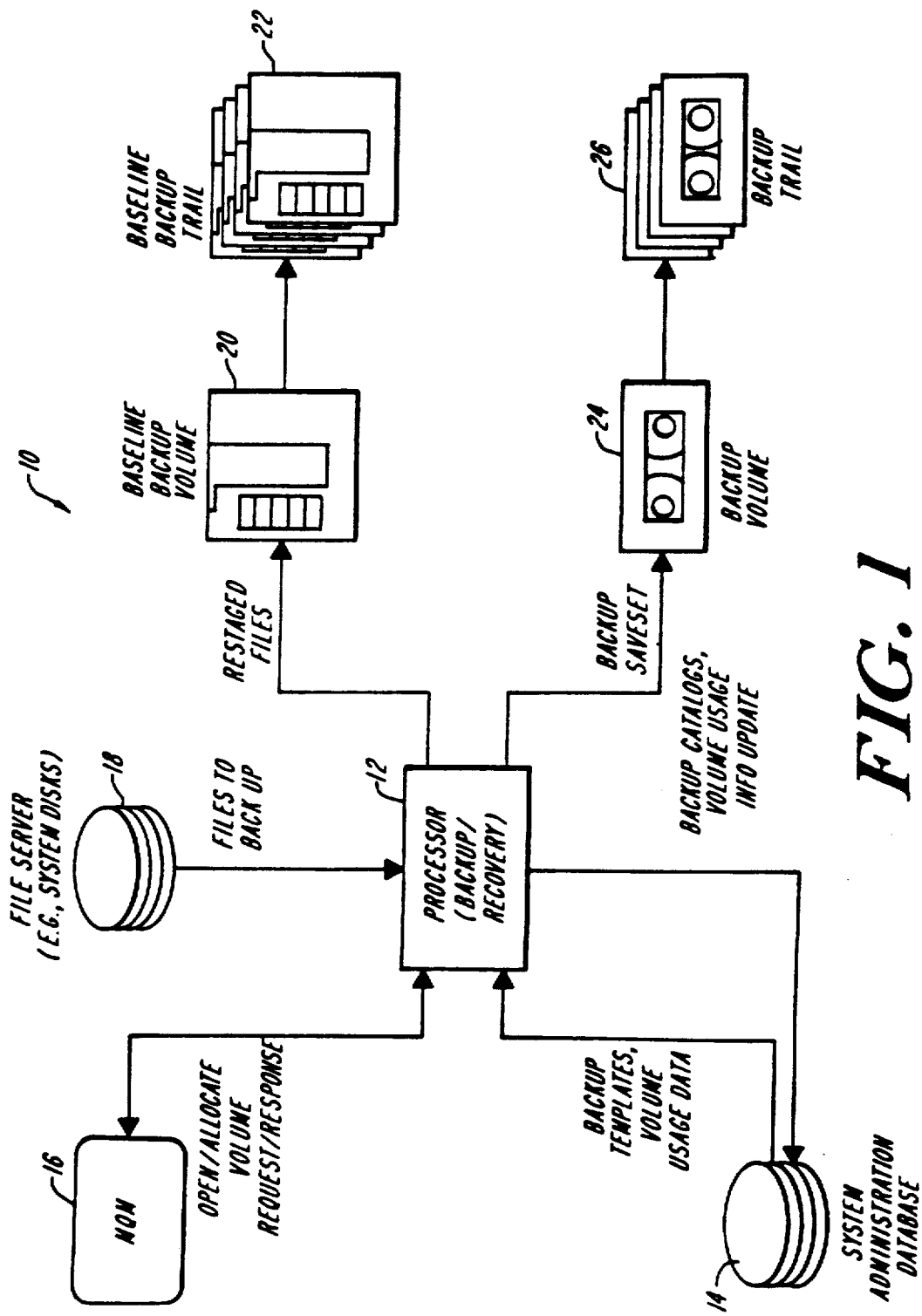
FIG. 1 depicts a digital data processing system constructed in accord with preferred practice of the invention.

FIG. 1 depicts a digital data processing system 10 with improved backup storage constructed in accord with a preferred practice of the invention. The illustrated system 10 includes central processor 12, which interacts with the other system components to carry out backup, compaction and recovery processes, as described below. Those components include a system administration database 14, a relational database that stores digital information representing backup templates (i.e., named configurations of the backup system) and backup catalogs (i.e., lists of all files copied to specific backup savesets). Additionally, a mount queue manager (MQM) 16 is provided to manage backup volumes. Particularly, the manager 16 is responsible for volume allocation, deallocation, and access control.

As further illustrated in FIG. 1, the system 10 includes a file server, represented by system disks 18, storing files accessed by system users, for example, via processor 12. It will be appreciated that in a high-capacity workstation or network, element 18 may represent a hierarchical or mass storage device (these and other data processing terms used herein are defined in Appendix A, attached hereto) employing magnetic disks, tapes, optical disks, and the like. Illustrated system 10 also includes baseline backup volume 20 and its associated drive (not shown), which forms a portion of baseline backup trail 22. The system 10 also includes full/incremental backup volume 24 and its associated drive (not shown), forming part of full/incremental backup trail 26.

In a preferred embodiment, processor 12 is a general purpose processor, preferably, running under the control of the UNIX operating system ("UNIX" is a registered trademark of AT&T Bell Information Systems, Inc.). Database 14 and manager 16 likewise preferably represent processes running under control of the operating system and utilizing system resources, including processor 12, core memory (not shown) and disks 18, in a manner generally known in the art and as specifically applied in accord with teachings provided herein.

Volumes 20 and 24, along with their drives, also represent conventional digital data processing equipment operated by processor 12 in accord with teachings provided herein. While volume 20 may be any storage media, preferably it is a tertiary storage media and, more preferably, an optical disk media. Moreover, while the volume 24 may represent any storage media, preferably it is a tertiary storage media and, more preferably, magnetic tape.

In the preferred embodiment discussed herein, backup processes, including baseline, full and incremental backups, and recovery processes are performed by processor 12 under the control of software prepared in accord with the teachings herein. The operation of the processor 12 in this regard is described below. For ease in understanding, the processor 12 is referred to as the "backup processor" when operating under control of the backup software and is referred to as the "recovery processor" when operating under control of the recovery software.

By way of an overview, a backup process carried out by a digital data processing system 10 constructed in accord with the invention is initiated, for example, by a system operator via a batch process or system console, who provides a backup template name. The backup processor 12 reads the specified backup template from the system administration database 14. These templates contain control parameters for the backup system, including file specifications for the baseline backup and the incremental backup. In a preferred embodiment, no file specification is used for the full backup as it covers all files.

As those skilled in the art will recognize, a file specification, or "filespec," is an expression that causes file characteristics (e.g., name and attributes) to be matched against predetermined parameters and return a boolean value indicating whether those characteristics and parameters agree. A filespec, for example, can be used to return the boolean value TRUE for all files named "/usr/foo" or, preferably, files that are stored on a tertiary volume.

The backup processor 12 uses the baseline backup filespec to locate files to be stored on the baseline backup trail 22. Selected files are copied to the baseline backup volume 20 and, if necessary, new baseline backup volumes are allocated via the mount queue manager 16. An identifier for each baseline backup copy is stored in the file directory on magnetic disk 18 as an attribute of its associated file. In one preferred embodiment, multiple identifiers are stored, permitting redundant backups and, hence, a higher degree of data security.

According to a preferred practice, the identifier includes a list of elements, each comprised of three pieces of information: the volume ID, the file starting offset, storage length and the file length. The file ID can refer to either secondary storage or backing storage in the server 18. This enables the backup processor 12 to properly backup and restore files in instances where the storage server 18 copies segments of files to multiple backing stores; or when the storage server 18 marks as obsolete only effected portions of the backing store when a file is modified, rather than marking as obsolete the entire backing store image.

During a full backup, the backup processor 12 copies to the backup volume 24 all files, except those that have already been backed up to the baseline backup trail 22 and that have not had their contents changed since the time of their baseline backup. During an incremental backup, the backup processor 12 use the incremental backup filespec to locate files to be copied to the full/incremental backup trail 26. In addition to files having selected attributes, the backup processor 12 also copies to the backup volume 24, files (or portions thereof) previously stored to the baseline backup trail 22 that have been modified since the date of their respective baseline backup.

During both full and incremental backup procedures, the processor 12 also copies to the full/incremental backup trail 26 the file characteristics, i.e., name and attributes (including the aforementioned baseline backup location identifier), of all files whose contents have been copied to the baseline backup volumes 20.

If the file has never been copied to a baseline backup volume, the entire file contents are written to the full-/incremental backup trail 26; conversely, if file has been copied to the corresponding baseline backup trail 22 and that file has not since been changed, none of the file contents are copied. If a file was modified after being copied to the baseline backup trail 22, in addition to copying the file (or portions thereof) to the full/incremental backup trail 26, the backup processor 12 will flag the corresponding portion of the baseline backup image as being obsolete.

The backup processor 12 records to the system administration database 14 a catalog of all files backed up to the baseline backup trail 22 and the and full/incremental backup trail 26.

A preferred backup processor 12 carries out the backup process with the storage server 18 online and available for access by its users. Contrary to prior art techniques, the processor 12 does not normally lock files during backup, relying instead upon a paradigm whereby each backed-up file is copied self-consistently during the current backup process or will be copied during the next backup process. Accordingly, the backup processor 12 attains the advantages of being both relatively inexpensive to implement and transparent to other running processes.

Preferably, the online backup procedure is carried out with the sequence of steps listed below.

For baseline backups

1. The backup processor 12 scans the filesystem, e.g., the directories of system disks 18, for candidate files to copy to the baseline backup volume 20.
2. The backup processor 12 sorts the candidate files using a two-level sort, as described below.
3. For each candidate filed, the backup processor 12:
  (a) Reads the file attributes, including a write count attribute that increases each time the file is modified. The processor 12 relies on write counts instead of timestamps because, on many digital data processing systems 10, the latter do not have sufficient resolution to catch all modifications.
  (b) If the file has been modified since it was selected as a candidate, the file is skipped.
  (c) The file is copied to the baseline backup volume 20.
  (d) The baseline backup file ID is recorded as an attribute of the original file if an only if the write count of the file has not changed. If the write count has changed, the file will not have a baseline backupfile ID attribute, and will therefore be copied to subsequent full/incremental backups.

For full/incremental backups

1. The backup processor 12 records its startup time as the backup date.
2. The backup processor 12 scans the filesystem, i.e., the directories of system disks 18, for candidate files to back up. Candidates for incremental backup are selected by the processor 12 according to the aforementioned constraints.
3. The backup processor 12 causes a table of contents for the backup to be written to the full/incremental backup volume 24. Each entry in the table includes the name of the file being copied, along with a unique file identifier which does not change if the file is renamed, but which does change if the named file is deleted and a new file is created with the same name. All files scanned during the process are entered in the table of contents, regardless of whether they are actually selected for backup. An indicator stored in each table entry reflects whether the file has been so selected.
4. For each candidate file, the backup processor 12:
  (a) Checks to see if the file changed from a directory to a non-directory file, or vice versa. Such files are skipped; since this change cannot be accomplished without modifying the file, they will be included in the next backup.

(b) Reads the file attributes, including a write count attribute that increases each time the file is modified. The processor 12 relies on write counts instead of timestamps because, on many digital data processing systems 10, the latter do not have sufficient resolution to catch all modifications.

(c) Initializes a retry counter. This counter, which is set to a preselected value by the system operator, determines how many times the processor 12 will attempt to backup a file before locking it.

(d) Writes the file attributes to the full/incremental backup volume 24.

(e) Copies to the backup volume 24 any portions of the file that are not on the baseline backup trail 22 associated with the current backup.

(f) Reads the file attributes. If the file was deleted, the processor 12 writes out a "file deleted" indicator to the table of contents and continues with the next file (i.e., jumps to step 4(a), above).

(g) If the file was modified, decrements and interrogates the retry counter. If that counter is non-zero, the processor 12 jumps to step 4(a), above. Otherwise, the processor 12 attempts to lock-out file accesses and copy the file to the backup volume to ensure a consistent copy. If file lock-outs are not permitted, the processor 12 writes out a "file inconsistently backed up" indicator, along with the file attributes. Such a file will be backed up consistently the next time the processor 12 runs a backup. The processor then jumps to step 4, above.

(h) Writes out a "file consistently backed up" indicator, along with the file attributes. The processor then jumps to step 4, above.

5. If the backup completes successfully, the processor 12 records the backup date for subsequent incremental backups.

During the backup process, the processor 12 sorts the files before they are copied. For example, in a preferred system 10 in which file server 18 includes tertiary storage, the tertiary storage volume is used as the primary sort key, thereby minimizing the number of backing store volumes that must be mounted. The location of the file on that volume is used as a secondary sort key, thereby insuring good performance for those devices with slow access times, such as magnetic tapes and disk devices with slow seek times. The illustrated system 10 utilizes this two-level sort when copying files to baseline backup volumes 20 (or compacting files thereon) and to full/incremental backup volumes 24.

Those skilled in the art will appreciate that, in a system of the type described above, as files are deleted from the storage server 18, baseline backup volumes 20, 22 accumulate "dead" storage space that is not referenced by any file on the server 18. To insure rapid data recovery, the baseline backup volumes 20, 22 are compacted to control the number of active baseline backup volumes, e.g., to ensure that the number of baseline backup volumes is not significantly larger than the number of tertiary storage volumes.

Preferably, the baseline backup volumes 20 are also compacted to minimize the time required for restorals, particularly, by controlling the number of volumes in trail 22 that must be processed to perform the restoral. As a result of the compaction process, new, dense baseline backup volumes are generated that have little or no dead space.

According to a preferred practice of the invention, baseline backup volumes 20 are compacted without reading data from the entire baseline backup trail 22. Information necessary to determine whether there exists references to a baseline backup image are stored in the file server 18 itself. When the processor 12 identifies a baseline backup file that is a copy of a file which resides in the file server 18, it need not read the baseline backup volume undergoing compaction. As a result, the baseline backup volume 20, 22 can remain safely in the backup vault; it is not necessary to mount them to compact them.

File recovery is performed by processor 12 executing the recover program, which interacts with same system components described above to actually retrieve the desired files. As above, the process may be initiated by the system operator, who provides to the recovery processor 12 the name of the backup template used when the files were originally backed up, along with a list of desired files (e.g., on the command line of the recover program).

The recovery processor 12 searches the backup catalogs in system administration database 14 for backup savesets with a matching backup template name. In a preferred embodiment, the processor 12 accepts a date range to bound the search; otherwise, the processor 12 begins the search with the most recent full backup and proceeds through the present. The processor 12 then searches the file catalog for each selected backup saveset for files that match those requested by the operator. Preferably, wildcard searching is supported.

Once backup volumes that contain the set of files to extract are identified, the recovery processor 12 causes the MQM 16 to open each volume in turn and to position it to the start of the backup saveset. The requested files are extracted from the backup saveset (or savesets), along with their attributes, and written to disk. In the event the contents of a requested file resides on a baseline backup volume 20, the recovery processor 12 records the name of the file in a list.

Preferably, files recovered by the processor 12 are reattached to the tertiary storage device, if any, they had at the time of backup. However, if any of the tertiary storage volumes referenced have been recycled, the file content is extracted from either the backup saveset 24 or the baseline backup volume 20, as appropriate, and the tertiary storage ID is set to NULL.

If the baseline backup volumes 20 are to serve as replacement tertiary storage volumes, recover scans all the files in the data store. For each file pointing to a non-existent tertiary storage volume, recover substitutes the baseline backup file ID for the tertiary storage file ID and sets the former to NULL.

Preferably, residency information, which is stored on the backup volumes 26, is properly restored when files are retrieved and stored back into memory 18. This residency information includes any portions of the file resident on secondary storage, as well as all pointers to backing store. It is not necessary to migrate a new copy of the file to backing store, nor is it necessary to retrieve the file from backing store if it was resident at the time of backup.

The preceding discussion describes the steps the recovery processor 12 takes when performing file recovery, i.e., a recovery process where the system operator desires to retrieve the named files from the backup volumes. According to one practice of the invention, the recovery processor also performs image recovery, which reconstructs an exact image of a directory (or filesystem or disk) as of the time of a particular past backup.

In performing image recovery, the recovery processor 12 executes additional steps beyond those described above. To begin, the processor 12 generally processes a full backup and all of the incremental backups to rebuild a file directory. In addition to extracting all the files in each backup saveset, the processor 12 performs all the file delete and rename operations pertaining to the directory.

Here, it will be appreciated that, when performing backup, the backup processor 12 records additional information with each backup saveset so that, when performing recovery, the processor 12 can determine which files were deleted or renamed between any two backups. More particularly, the backup processor 12 records the names and unique file identifications of all files scanned during a backup, rather than just those of the files that actually copied to the backup volumes.

Using this information, a preferred recovery processor 12 determines which files, if any, have been deleted or renamed between backups by comparing the symbol table of a current backup saveset to that of the last backup saveset processed. The symbol table of the previous backup saveset is saved by the recovery processor 12 in a temporary file when it is recovering an image.

A preferred sequence of operation for recovery processor 12 carrying out an image recovery is presented below:

1. The processor 12 reads in the a table of contents from the backup volume.
2. If the volume is an incremental backup volume 24, the processor reads in the old table of contents saved in step 6, below.
3. For each filename in the symbol table selected for recovery, the processor 12 checks if filename exists in the new symbol table but the unique file ID is paired with a different name in the old symbol table, if so, it renames the file. On systems that support multiple names for one file, the processor 12 creates a new name for the file. If the filename already exists, the processor 12 first assigns the file a temporary name. (Such can be the case with the sequence "rename a c"; "rename b a"; "rename c b").
4. For each filename in the old symbol table that is unreferenced in the new symbol table, the processor 12 deletes the file. This includes any temporary files generated in step 3, above.
5. The processor 12 extracts selected files from the backup volume, 20 or 24.
6. The processor 12 saves the current table of contents.

The procedure outlined above removes any inconsistencies that might otherwise be introduced into the filesystem by the backup processor 12 during the backup process. Particularly, the procedure insures that files which are deleted or renamed between backups are correctly deleted or renamed in the reconstructed image. The procedure assumes that the selected backups are sorted in date order, and that the first backup is a full backup.

An additional potential difficulty arises when a directory is renamed while backup is scanning for files, resulting in backup never "seeing" the directory and, consequently, the directory not appearing in the table of contents for the backup. To avoid deletion of the directory by the recovery processor 12, directories that appear to be deleted are preferably not removed until they fail to appear in two successive backups. Because the probability that the same directory will be renamed at the same instant in two successive backups is vanishingly small, this insures that a directory will not be improperly deleted. Those skilled in the art will appreciate that this potential difficulty does not arise for non-directory files if the renaming of such files is treated as a content modification (whereas the renaming of a directory—although considered a content modification of a directory—is not treated as a content modification of the files listed in that directory).

As those skilled in the art will appreciate, the backup of hierarchical storage servers presents additional difficulties which must be taken into consideration. First and foremost is the amount of data that must be backed up, one to two orders of magnitude more data than on a conventional storage server.

Conventional backup systems do not make backup copies of that data stored, for example, in tertiary storage. Instead, they rely on the storage migration service. A typical approach is to make two or more copies of a file on different tertiary storage volumes, using a migration policy tuned to minimize the number of accesses to non-resident files. Systems that employ such a strategy do not maintain a clear distinction between those files that are backups and those that are part of the virtual data store which happen to reside on tertiary storage.

To the contrary, a digital data processing system 10 constructed in accord with the invention relies on a backup strategy tuned to minimize the number of modifications to files on the baseline backup volume 20. The advantage of this approach is that baseline backups can use a different candidate selection policy than conventional storage migration. Since in most computer systems READ accesses far outnumber WRITE access, the baseline backups according to the present invention are intended to reduce the storage space and time required for backups.

Filed herewith is a listing of preferred software modifications, intended for use in conjunction with the More/bsd UNIX operating system software commercially available from Mt. Xinu, Inc., for controlling processor 12, database 14 and manager 16 in the manner described above. A further understanding of the structure and operation of a filesystem, e.g., disks 18, of a preferred digital data processing system as described above may be attained by reference to copending, commonly-assigned U.S. patent application Ser. No. 454,066, entitled "DIGITAL DATA STORAGE APPARATUS WITH IMPROVED DATA MIGRATION" and filed this day herewith, the teachings of which are incorporated herein by reference.

A digital data processing system 10 constructed and operated in accord with the above teachings can vastly reduce the amount of time required to back up any storage server, e.g. system disks 18, by greatly reducing the amount of data that must be copied when performing full backups. For example, given a storage server with 100 GB of data and a backup system capable of copying data at 1 MB/sec, it takes 28.5 hours to perform a full backup. If the baseline backup filespec selects 95% of the files, a baseline backup system need copy only 5 GB of data during a full backup, which takes approximately 1.5 hours. Of course, it will be appreciated that additional 95 GB of data is still copied; however, this occurs at some earlier point to the baseline backup volumes.

Particularly, the approach described above spreads out the copying of the data in a manner akin to performing daily incremental backups of changed data. Therefore, it is never necessary to copy the whole 100 GB at once. While performing only incremental backups (i.e., never taking a full backup after the initial one) also has this characteristic, such a procedure does not provide the advantages of point 2, below.

Moreover, enough information is kept so it is possible to compact the baseline backup volumes 20, that is, create new baseline backup volumes that do not contain "dead" space (images of files that were subsequently deleted). Compaction can be performed incrementally on an as-needed basis. As a result, the number of volumes in the baseline backup trail 22 (and therefore the restoral time) is a function of the amount of data to be backed up. The number of incremental backup volumes 24 in a traditional backup system is a function of the product of the amount of data to be backed up and the number of backups performed (elapsed time).

Further, it is not necessary to refer to the baseline backup volumes to perform the compaction operation. All the necessary information (file attributes and contents) is contained on the secondary store and associated tertiary store in the case of an hierarchical storage server.

The foregoing describes an improved digital data processing method and apparatus with improved backup storage. Those skilled in the art will appreciate that the certain modifications, deletions and additions are well within the ken of those of ordinary skill, and that systems so modified fall within the scope of the claimed invention set forth below.

APPENDIX A

To facilitate understanding of the attached application, the following terms are defined:

storage server—A computer system supporting one or more high-speed secondary storage devices, typically magnetic or erasable-optical disk based.

hierarchical or mass storage server—A storage server that emulates a large amount of high-speed secondary storage through use of a fixed amount of high-speed secondary storage as a cache for a large amount of slower tertiary storage. This technique may be applied recursively to an arbitrary depth, hence the name "hierarchical" storage server.

secondary store—High-speed secondary storage of an hierarchical storage server, typically magnetic or erasable-optical disks.

backing store—Tertiary and higher levels of storage of an hierarchical storage server, typically erasable optical, write-once-read-many (WORM), and tape volumes.

backup—A duplicate copy of data from a storage server; the copy is restored if the original is lost.

full backup—A complete copy of a specified set of data.

incremental backup—A copy of a portion of a specified set of data or files that has been modified since a specified date, usually the date of the last full or incremental backup.

What is claimed is:

1. A digital data processing system with improved backup storage comprising

A. memory means for storing one or more files comprising information-representative signals, each said file having a first characteristic, including a file identifier and zero, one or more attributes,
   B. baseline-backup means, coupled to said memory means, for retrieving from said memory means files having a first selected characteristic and storing copies thereof, said copies being referred to as "baseline-backup" copies,
   said baseline-backup means including means for generating signals representative of storage locations of respective ones of said baseline-backup copies,
   C. full-backup means, coupled to said memory means, for
      (i) retrieving, from said memory means, files
         a) for which baseline-backup copies are not stored, or
         b) for which baseline-backup copies are stored, but which have been updated since a time of their retrieval from said memory means for storage as baseline-backup copies, and storing copies of said files or portions thereof, said copies being referred to as "full-backup" copies,
      (ii) storing, along with said full-backup copies, said file identifiers and said signals representative of storage locations of respective ones of said baseline-backup copies for files for which baseline-backup copies are stored, but which files have not been updated since a time of their retrieval from said memory means by said baseline-backup means for storing as baseline-backup copies.

2. A digital data processing system according to claim 1 comprising image recovery means for recovering one or more of a directory, a filesystem and a disk of said files from backup storage, said image recovery means comprising
   A. means for retrieving all baseline-backup, full-backup and incremental-backup copies associated with files, including those representing directories, having a selected characteristic,
   B. means for storing those files in said memory means, and
   C. means for deleting only those directory-representative files for which copies are not stored in any baseline-backup, full-backup and incremental-backup copies stored on two or more successive dates.

3. A digital data processing system according to claim 1 comprising file recovery means for recovering a file from backup storage, said file recovery means comprising
   A. means for retrieving one or more baseline-backup, full-backup and incremental-backup copies associated with a selected file,
   B. generating therefrom information-representative signals comprising said file,
   C. storing those information-representative signals in said memory means.

4. A digital data processing system according to claim 3, wherein said recovery means includes means for restoring residency information associated with files having one or more of tertiary storage or baseline-backup copies.

5. A digital data processing system according to claim 1, wherein said baseline-backup means comprises means for modifying a file characteristic associated with a file for which a baseline-backup copy is stored to include the storage location-representative signal associated with that file.

6. A digital data processing system according to claim 5, wherein said storage-location representative signal includes one or more file storage identifications, file storage starting offsets, and file storage lengths.

7. A digital data processing system according to claim 1, wherein at least one of said baseline-backup means and said full-backup means includes means for sorting, respectively, said baseline-backup copies and said full-backup copies.

8. A digital data processing system according to claim 7, wherein said sorting means includes means for sorting said copies as a function, primarily, of volumes on which associated files are stored in said memory means and, secondarily, of locations of those files in those volumes.

9. A digital data processing system according to claim 1 further comprising
   A. incremental-backup means for retrieving, from said memory means, files
      (i) which have a second selected characteristic, and
      (ii) which have been updated since a time of their retrieval from said memory means for storing as any of a baseline-backup, full-backup or incremental-backup copy
      and for storing copies thereof, said copies being referred to as "incremental-backup" copies,
   B. means for storing, along with said incremental-backup copies, said file identifiers and said signals representative of storage locations of respective ones of said baseline-backup copies for files for which baseline-backup copies are stored, but which files have not been updated since a time of their retrieval from said memory means by said baseline-backup means for storing as baseline-backup copies, and
   C. means for storing, along with said incremental-backup copies, file identifiers and said signals representative of storage locations of respective ones of said full-backup copies and said incremental-backup copies for files which have been stored, but which files have not been updated since a time of their retrieval from said memory means by said full-backup or said incremental-backup means for storing as full-backup copies or incremental backup copies, respectively.

10. A digital data processing system according to claim 2, wherein said incremental backup means includes means for sorting said baseline-backup copies as a function, primarily, of volumes on which associated files are stored in said memory means and, secondarily, of locations of those files in those volumes.

11. A digital data processing system according to claim 9, wherein at least one of said baseline-backup, full-backup and incremental backup means includes means for identifying a file that has been updated based upon a change in its write count.

12. A digital data processing system according to claim 1 wherein said first selected characteristic represents those files stored in said memory system that are less frequently updated.

13. A digital data processing system according to claim 12 wherein

A. said memory means comprises a hierarchical storage server comprising tertiary storage media, and
B. said first selected characteristic represents files stored on said tertiary storage media.

14. A digital data processing system according to claim 13 wherein said baseline-backup means includes
   A. means for storing a baseline-backup copy on storage medium having associated therewith a volume identification,
   B. means for modifying the characteristics of a file for which a baseline-backup copy is stored to reflect the volume identification of the storage medium upon which that baseline-backup copy is stored.

15. A digital data processing system according to claim 14 comprising means for treating baseline-backup copies as tertiary media-stored files.

16. A digital data processing system according to claim 1, wherein said baseline-backup means includes means for selecting said first selected characteristic to be substantially similar to a migration selection policy of said memory means.

17. A digital data processing system according to claim 16, wherein said baseline-backup means comprises compaction means for eliminating baseline backup-copies associated with at least selected files.

18. A digital data processing system according to claim 17, wherein said compaction means includes means for eliminating baseline-backup copies without retrieving information from media upon which they are stored.

19. A digital data processing system according to claim 17, wherein said compaction means includes means for eliminating baseline-backup copies associated with deleted files.

20. A method for operating a digital data processing system with improved backup storage, said method comprising the steps of
   A. storing in a memory means one or more files comprising information-representative signals, each said file having a characteristic, including a filename and zero, one or more attributes,
   B. retrieving from said memory means files having a first selected characteristic and storing copies thereof, said copies being referred to as "baseline-backup" copies, generating signals representative of storage locations of respective ones of said baseline-backup copies,
   C. retrieving, from said memory means, files
      i) for which baseline-backup copies are not stored and which have a second selected characteristic, or
      ii) for which baseline-backup copies are stored and which have been updated since a time of their retrieval from said memory means for storing as baseline-backup copies,
      and storing copies of said files or portions thereof, said copies being referred to as "full-backup" copies, and
   D. storing, along with said full-backup copies, said signals representative of storage locations of respective ones of said baseline-backup copies for files for which baseline-backup copies are stored, but which files have not been updated since a time of their retrieval from said memory means by said baseline-backup means for storing as baseline-backup copies.

* * * * *